United States Patent
Wada et al.

(10) Patent No.: US 10,259,130 B2
(45) Date of Patent: Apr. 16, 2019

(54) HAND-OPERATED TOOL LOCK MECHANISM

(71) Applicants: Yoshikazu Wada, Sakai (JP); Lawrence Y Igarashi, Coto De Caza, CA (US)

(72) Inventors: Yoshikazu Wada, Sakai (JP); Lawrence Y Igarashi, Coto De Caza, CA (US)

( * ) Notice: Subject to any disclaimer, the term of this patent is extended or adjusted under 35 U.S.C. 154(b) by 0 days.

(21) Appl. No.: 15/656,087

(22) Filed: Jul. 21, 2017

(65) Prior Publication Data

US 2018/0304478 A1  Oct. 25, 2018

(30) Foreign Application Priority Data

Apr. 24, 2017  (JP) .............................. 2017-084986

(51) Int. Cl.
| | |
|---|---|
| *A01G 3/02* | (2006.01) |
| *B25B 7/14* | (2006.01) |
| *B25G 1/10* | (2006.01) |
| *B26B 13/16* | (2006.01) |

(52) U.S. Cl.
CPC ............... *B26B 13/16* (2013.01); *A01G 3/02* (2013.01); *B25B 7/14* (2013.01); *B25G 1/102* (2013.01)

(58) Field of Classification Search
CPC .............. B25B 7/14; A01G 3/02; B25G 1/102
See application file for complete search history.

(56) References Cited

U.S. PATENT DOCUMENTS

| | | | | |
|---|---|---|---|---|
| 298,548 | A * | 5/1884 | Bubach .................... | B26B 13/16 30/261 |
| 507,973 | A * | 10/1893 | Cox .......................... | B25B 7/14 81/336 |
| 1,061,358 | A * | 5/1913 | Culver ..................... | B25B 7/14 294/110.1 |
| 1,741,109 | A * | 12/1929 | Heimerdinger ......... | B26B 13/16 30/262 |
| 2,028,558 | A * | 1/1936 | Nietzel ................... | A45D 29/02 30/186 |

(Continued)

FOREIGN PATENT DOCUMENTS

| | | | | |
|---|---|---|---|---|
| FR | 517000 | A * | 4/1921 | ............... A01G 3/02 |
| FR | 1368266 | A * | 7/1964 | ............... A01G 3/02 |
| JP | 3067477 | | 12/2000 | |

*Primary Examiner* — Jonathan G Riley
(74) *Attorney, Agent, or Firm* — Steven A. Nielsen; www.NielsenPatents.com (57) ABSTRACT

A hand-operated tool lock mechanism secures a pair of grips in a closed locked state. The mechanism includes: a holding recess at the end of one grip; an engaging recess at the end of the other grip; a ring component removably and rotatably disposed in the holding recess, which engages with the engaging recess placing the grips in the closed state; and a catch for removably and rotatably inserting the ring component in the holding recess. The holding recess and the catch hold the ring component oriented away from the other grip when the ring component is disengaged from the engaging recess. When the hand-operated tool is used, the releasing of the ring component from the locked state causes the ring component to be held between the holding recess and the catch in an orientation in which the ring component does not contact the other grip.

8 Claims, 13 Drawing Sheets

(56) References Cited

U.S. PATENT DOCUMENTS

| | | | | |
|---|---|---|---|---|
| 3,869,793 | A | * | 3/1975 | Ferguson .................. B25B 7/14 30/262 |
| 3,921,478 | A | * | 11/1975 | Ygfors ............... A61B 17/2812 30/261 |
| D250,166 | S | * | 11/1978 | Davies ............................. D8/5 |
| D256,541 | S | * | 8/1980 | Davies ............................. D8/5 |
| 5,101,563 | A | * | 4/1992 | d'Orgelys .............. A45D 29/02 30/262 |
| 5,426,857 | A | * | 6/1995 | Linden .................... A01G 3/02 30/254 |
| 5,628,115 | A | * | 5/1997 | Hebert ..................... B25B 7/06 30/261 |
| 6,202,517 | B1 | | 3/2001 | Dolan |
| 6,446,344 | B1 | * | 9/2002 | Gontar ................... B26B 13/16 30/262 |
| D632,938 | S | * | 2/2011 | Papenfuss ....................... D8/57 |
| 2003/0070300 | A1 | * | 4/2003 | Huang ..................... B25B 7/08 30/262 |
| 2004/0254604 | A1 | * | 12/2004 | Viart ................. A61B 17/2833 606/205 |
| 2012/0096995 | A1 | * | 4/2012 | Shih ....................... B25B 7/123 81/370 |
| 2016/0294168 | A1 | * | 10/2016 | Hoppe ..................... B25B 7/02 |

\* cited by examiner

FIG. 10
Prior Art

HAND-OPERATED TOOL LOCK MECHANISM

RELATED PATENT APPLICATION AND INCORPORATION BY REFERENCE

This is a utility application based upon and claims priority of U.S. patent application Japanese Patent Application No. 2017-084986 filed on Apr. 24, 2017. This related application is incorporated herein by reference and made a part of this application. If any conflict arises between the disclosure of the invention in this utility application and that in the related provisional application, the disclosure in this utility application shall govern. Moreover, the inventor(s) incorporate herein by reference any and all patents, patent applications, and other documents hard copy or electronic, cited or referred to in this application.

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

BACKGROUND OF THE INVENTION

(1) Field of the Invention

The invention generally relates to hand-operated tools such as garden scissors, pruning shears, and pliers, and includes a hand-operated tool comprising a spring that forces or biases the hand-operated tool into a normally-open state, wherein the tool cuts or clamps an object by the inward squeezing of a pair of grips. More particularly, the invention relates to a lock mechanism that secures hand-operated tool grips in a closed state when the hand-operated tool in not in use.

(2) Description of the Related Art

Japanese Utility Model Registration No. 3067477, sometimes referred to herein as "PTL 1" may be considered to be in the same field of the invention but fails to anticipate the presently claimed invention.

Figure 9:
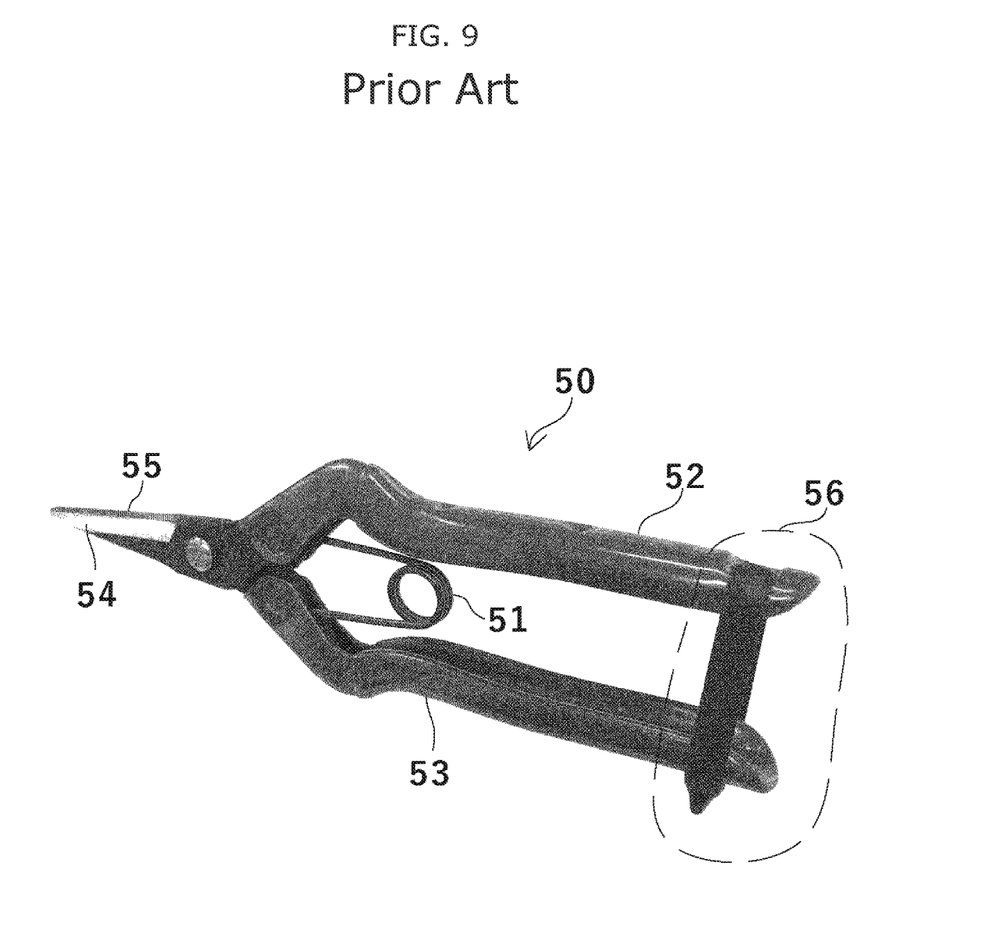
FIG. 9 is a prior art or conventional lock mechanism found in a hand operated tool.
Figure 10:
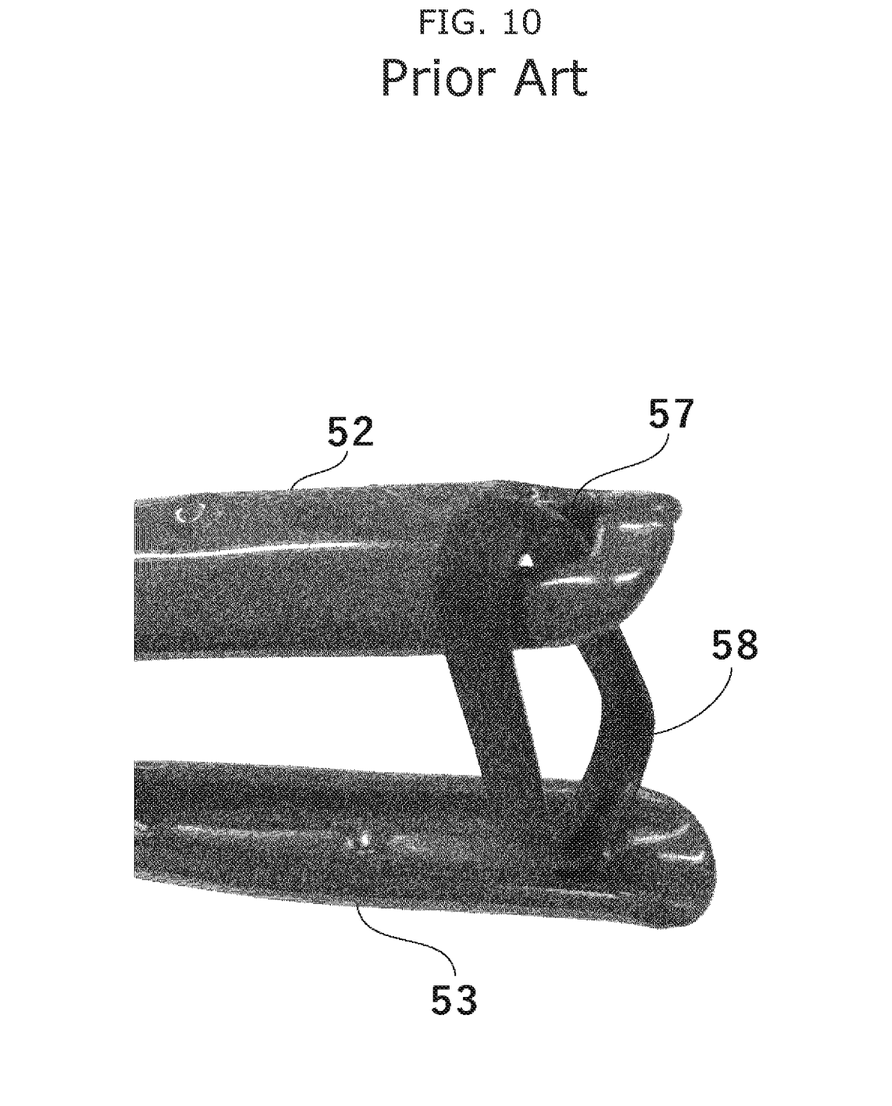
FIG. 10 is an enlarged view of a prior art locking mechanism.

Japanese Utility Model Registration No. 3067477 is shown herein in prior art FIG. 9 and prior art FIG. 10. Prior art FIG. 9 illustrates scissors 50 as an example of a hand-operated tool. Scissors 50 include spring 51 that forces scissors 50 into a normally-open state. A user cuts an object by squeezing together a pair of grips 52 and 53 to thereby close blades 54 and 55. Scissors 50 include lock mechanism 56 which prevents blades 54 and 55 from opening when not in use. As illustrated in enlarged manner in FIG. 10, lock mechanism 56 includes opening 57 provided at the end of grip 52, ring component 58 that passes through opening 57, and an engaging portion provided in grip 53. By engaging ring component 58 with the engaging portion of grip 53, blades 54 and 55 are placed in the closed locked state.

For example, Patent Literature (PTL) 1 discloses shears in which blades are kept in a closed state by a hook-shaped stopper, which is pivotally supported at the end of one grip to allow swinging, being removably engaged with an engaging portion provided at the end of the other grip (FIG. 3, paragraph [0009]).

CITATION LIST/PATENT LITERATURE

[PTL 1] Japanese Utility Model Registration No. 3067477

SUMMERY/TECHNICAL PROBLEM

Scissors 50 require a process for punching opening 57 in grip 52, and a process of opening an end of opening 57 to pass the ring component through and then closing the end. In the same manner, the shears disclosed in PTL 1 require processing to prepare a pivot in the one grip and pivotally fasten the stopper, and thus the fabrication processes is complex. Furthermore, during use, there is a risk that ring component 58 or the stopper may come into contact with the other grip, and in such a case, it is necessary to correct the orientation of ring component 58 or the stopper and regrasp the grips, which is inconvenient.

The present invention is conceived to solve the above-described problems and has as an object to provide a hand-operated tool lock mechanism which, using a simple configuration, prevents the ring component or the stopper from coming into contact with the other grip at the time of use after the lock mechanism is released.

Solution to Problem

In order to achieve the aforementioned object, a hand-operated tool lock mechanism according to the present invention is a hand-operated tool lock mechanism which is included in a hand-operated tool for cutting or clamping an object by a pair of grips which are forced into a normally-open state being squeezed together, and which fixes the pair of grips in a closed locked state, the hand-operated tool lock mechanism including: a holding recess provided at an end of one grip of the pair of grips; an engaging recess provided at an end of the other grip of the pair of grips; a ring component which is removably and rotatably provided in the holding recess and engages with the engaging recess to place the pair of grips in the closed locked state; and a catch for removably and rotatably inserting the ring component in the holding recess, wherein when the ring component is disengaged from the engaging recess, the holding recess and the catch hold the ring component there between in an orientation in which the ring component is apart from and does not contact the other grip even when the pair of grips are closed.

The ring component may have a portion which is held in the holding recess, the portion having a cross-section that is an ellipse or a shape having at least one straight portion, and the holding recess and the catch may hold the ring component there between in the orientation, with no play or with play.

In addition, the ring component may further have, in an inner circumferential surface, projecting portions which fix an orientation of the ring component by holding the end of the one grip there between, when the ring component is disengaged from the engaging recess.

The pair of grips may be identical structures, and the ring component may have an engaging portion which engages with the engaging recess of the other grip.

Each grip of the pair of grips may be a single-piece product molded from resin, and the catch may be disposed near an opening of the holding recess and may have a shape of a tongue piece that is swingable.

The resin may have rubber elasticity.

Advantageous Effects

According to the present invention, a hand-operated tool lock mechanism is completed by merely attaching the ring component to one grip via the catch. When the hand-operated tool is used, the operation of releasing the ring component from the locked state causes the ring component to be held between the holding recess and the catch in an orientation in which the ring component does not contact the other grip.

BRIEF DESCRIPTION OF THE DRAWINGS

These and other objects, advantages and features of the invention will become apparent from the following description thereof taken in conjunction with the accompanying drawings that illustrate a specific embodiment of the present invention.

These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The hand-operated tool that includes the lock mechanism according to the present invention refers to, among hand-operated tools such as garden scissors, pruning shears, and pliers, a hand-operated tool of the type which cuts or clamps an object by a pair of grips which are forced into a normally-open state being squeezed together. The lock mechanism includes a holding recess provided at the end of one grip; an engaging recess provided at the end of the other grip; a ring component which is removably and rotatably provided in the holding recess, and which places the pair of grips in a closed locked state by engaging with the engaging recess; and a catch for removably and rotatably inserting the ring component in the holding recess. Following the operation of disengaging the ring component from the engaging recess, the holding recess and the catch hold the ring component there between such that the ring component is placed in an orientation in which the ring component is apart from and does not contact the other grip even if the pair of grips are closed, specifically, an orientation assumed by the ring component at the time of disengagement, or an orientation in which the ring component is apart from the other clip even if gravity causes the ring component to return from such orientation at the time of disengagement, or an orientation in which the ring component is apart from the engaging recess by at least as much as such orientation at the time of disengagement.

Hereinafter, description is carried using scissors as an example of a hand-operated tool including the lock mechanism according to the present invention.

Figure 1:
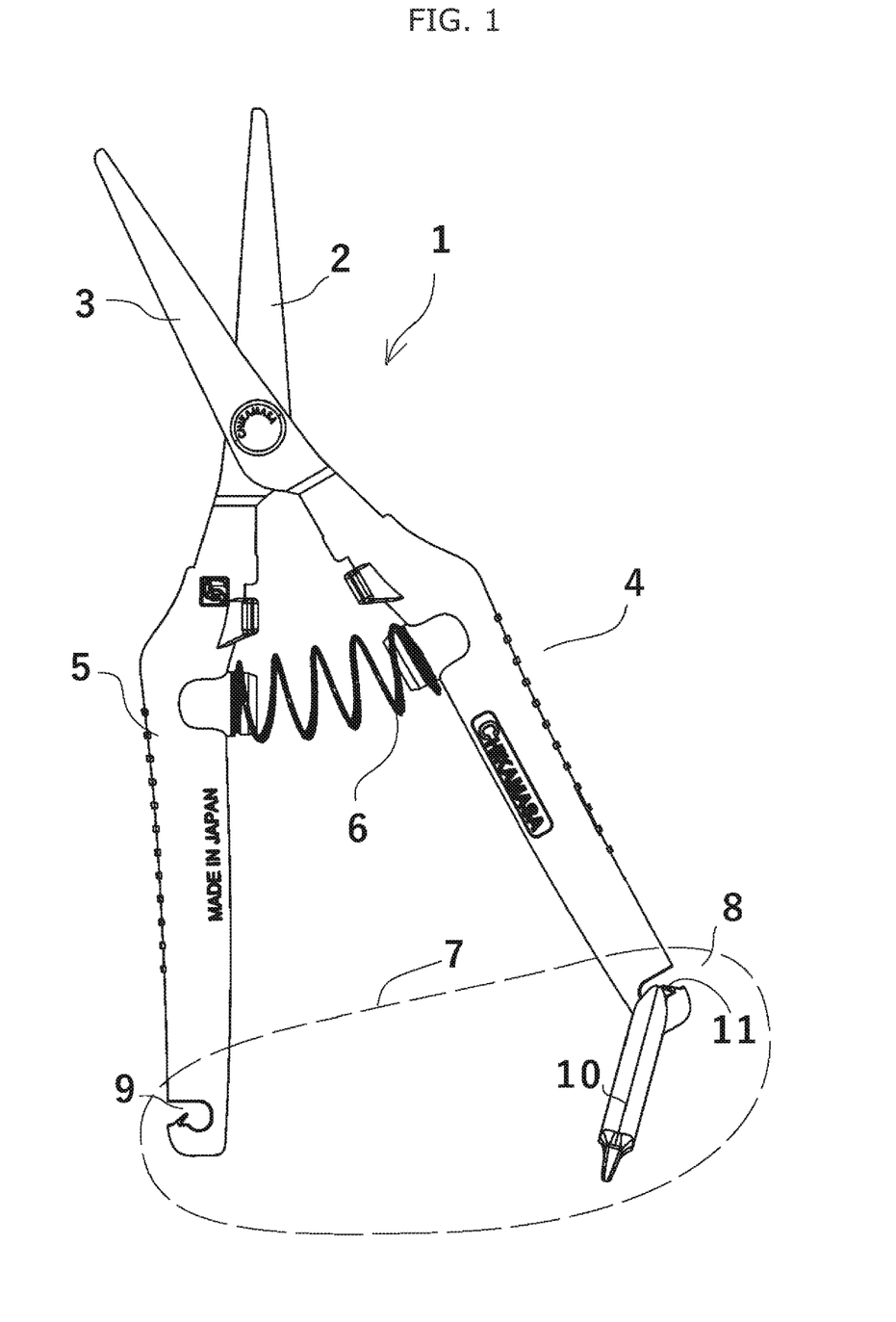
FIG. 1 depicts a perspective view of a presently disclosed embodiment.

FIG. 1 is a front view of scissors 1. Scissors 1 include a pair of grips 4 and 5 which open and close blades 2 and 3, spring 6 which forces grips 4 and 5 into a normally-open state, and lock mechanism 7 which holds grip 4 and 5 in a closed state.

Lock mechanism 7 includes holding recess 8 provided at the end of one grip 4, engaging recess 9 provided at the end of another grip 5, and ring component 10 (see FIGS. 4A to 4D) removably and rotatably attached to holding recess 8. Grips 4 and 5 are single-piece resin molded products having the same structure, and swingable tongue piece-shaped catch 11 is provided near the opening of holding recess 8. By integrally forming catch 11 in grip 4, the number of components can be reduced, and thus failure rate can also be reduced.

Figure 2:
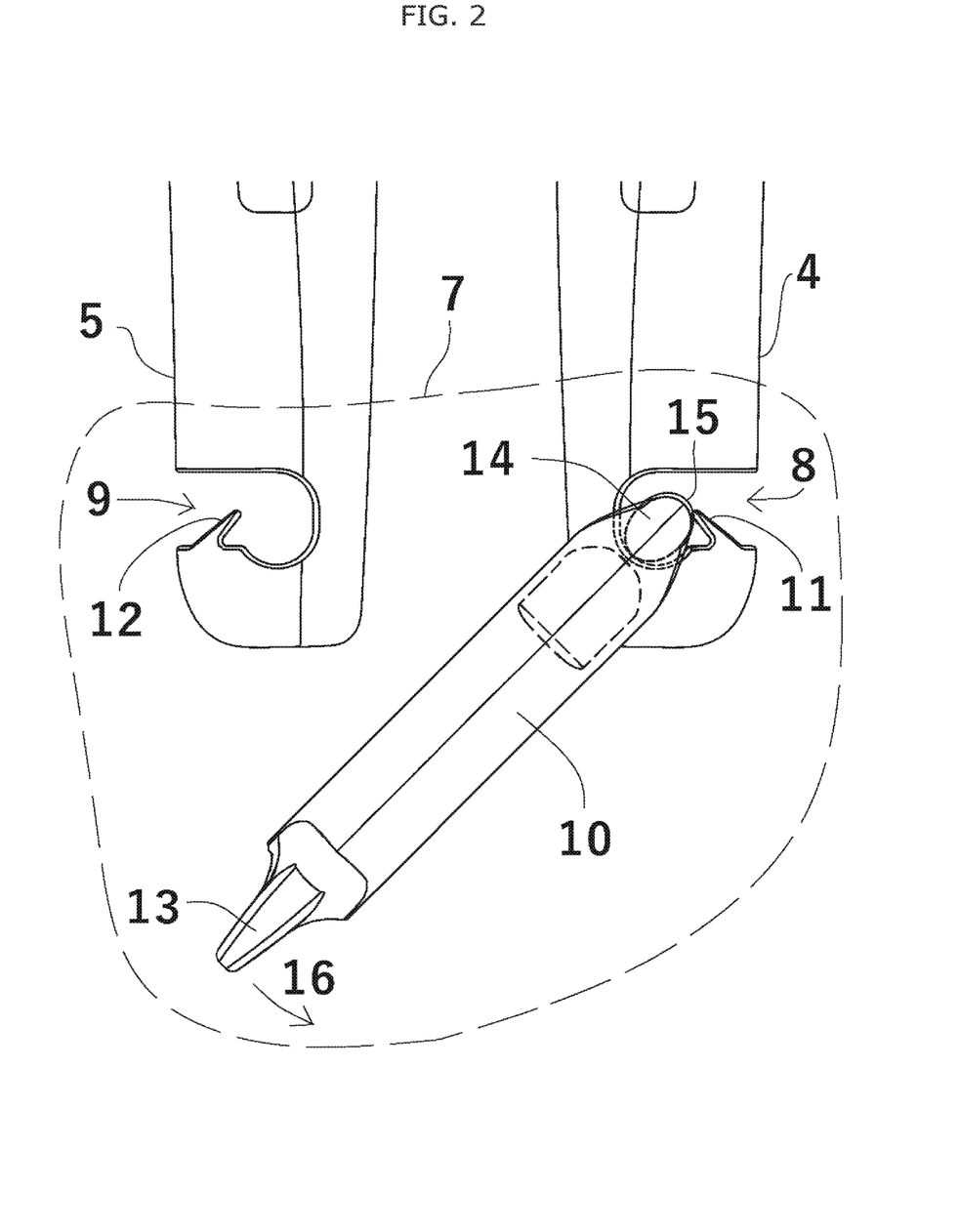
FIG. 2 depicts an enlarged view of a disclosed lock mechanism in an unlocked position.

FIG. 2 is a partial enlarged view of lock mechanism 7 illustrated in FIG. 1. Holding recess 8 of grip 4 and engaging recess 9 of grip 5 have the same shape, and include, near their openings, catches 11 and 12, respectively. Ring component 10 which has been placed in holding recess 8 by passing catch 11 is held by holding recess 8 and catch 11, and, as illustrated in the figure, is held oriented away from the other grip 5, that is, held in an orientation (lock-released orientation) in which tip portion 13 of ring component 10 does not contact grip 5 when the pair of grips 4 and 5 are closed. More specifically, as illustrated by the dotted lines in the figure, the cross-section of holding portion 14 of ring component 10 which is held in holding recess 8 is elliptical.

The tip of the tongue piece shape of catch 11 is designed so as to abut the position of apex portion 15 of holding portion 14 or a slightly lower position. Ring component 10 is held by holding recess 8 and catch 11 to have play and allow rotation in the direction of arrow symbol 16. It should be noted that the special shape defined by holding recess 8 and catch 11 can be formed to hold more tightly when ring component 10 is in the lock-released orientation, so that there is no play.

Figure 3:
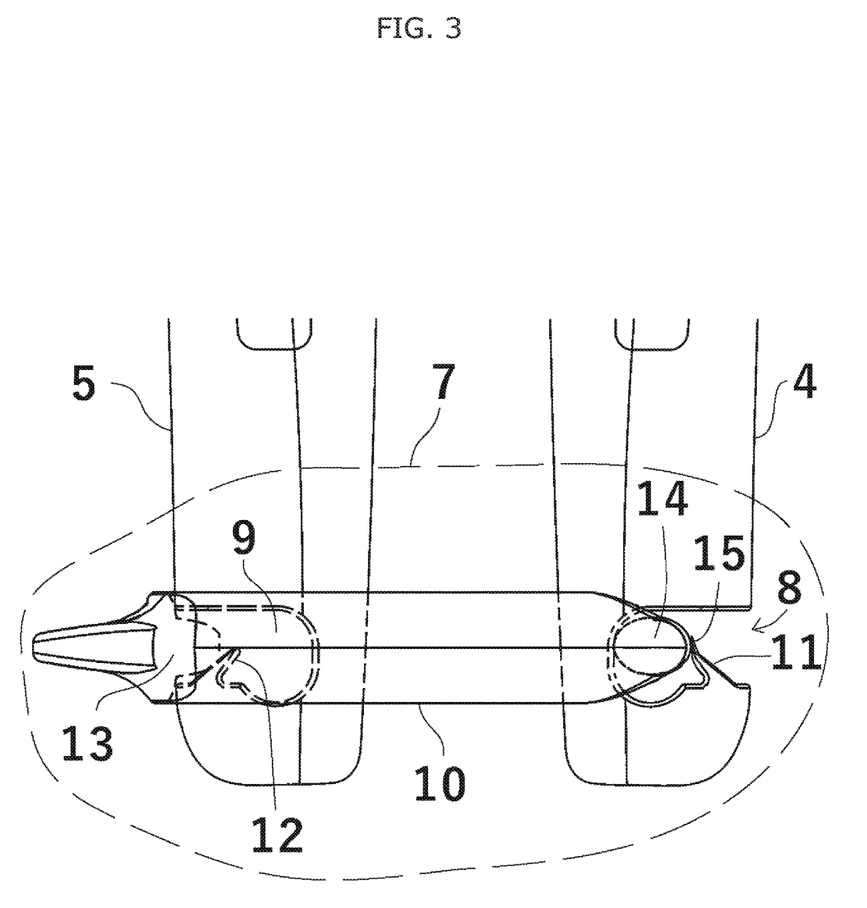
FIG. 3 depicts an enlarged view of a disclosed lock mechanism in a closed position.

FIG. 3 illustrates the locked state in which grips 4 and 5 are closed by lock mechanism 7. The locked state is realized by engaging ring component 10 with engaging recess 9. As illustrated by the dotted lines in the figure, the cross-section of tip portion 13 of ring component 10 has, as an engaging portion, a portion that fits into engaging recess 9 (see FIG. 4B). Since grip 5 is an identical structure as grip 4, catch 12 having the same shape as catch 11 is present in engaging recess 9. Aside from not hindering tip portion 13 from engaging with engaging recess 9, catch 12 functions to come into contact with tip portion 13 and stabilize the position of tip portion 13. Catch 11 of holding recess 8 holds ring component 10. Catch 11 pushes against apex portion 15 of holding portion 14, and, when ring component 10 is disengaged from engaging recess 9, induces ring component 10 to assume the orientation illustrated in FIG. 2.

Figure 4A:
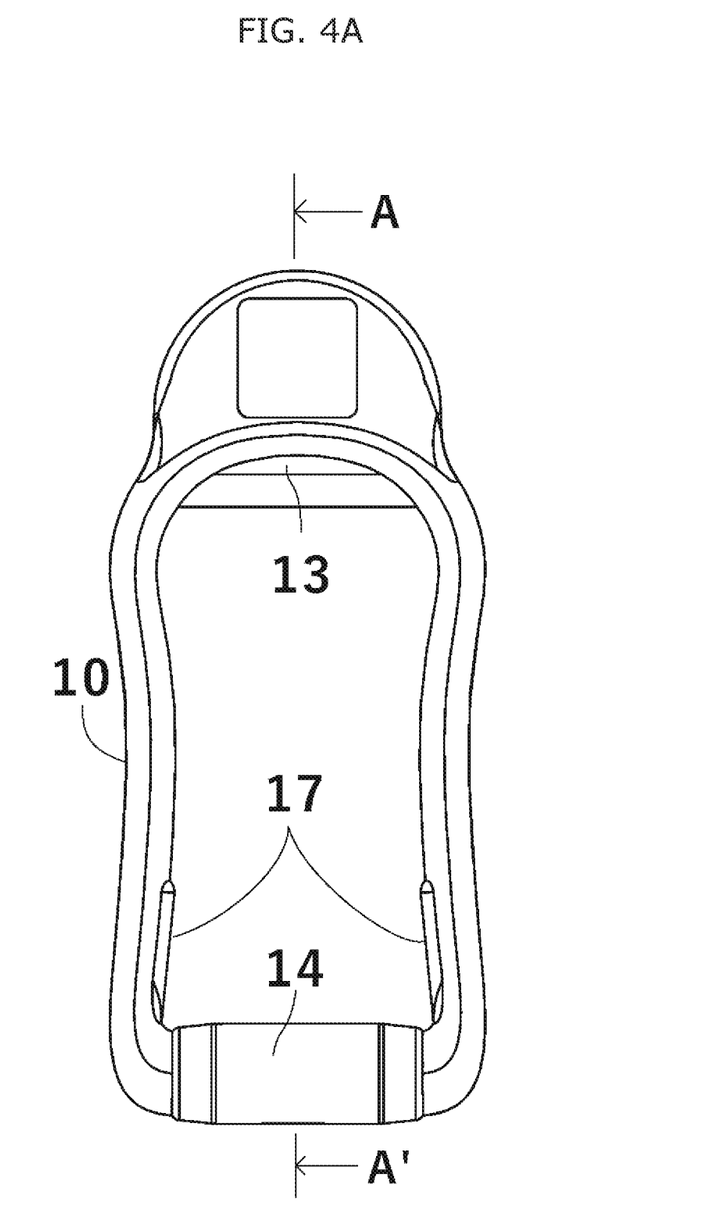
FIG. 4A depicts a front view of a disclosed ring component.
Figure 4B:
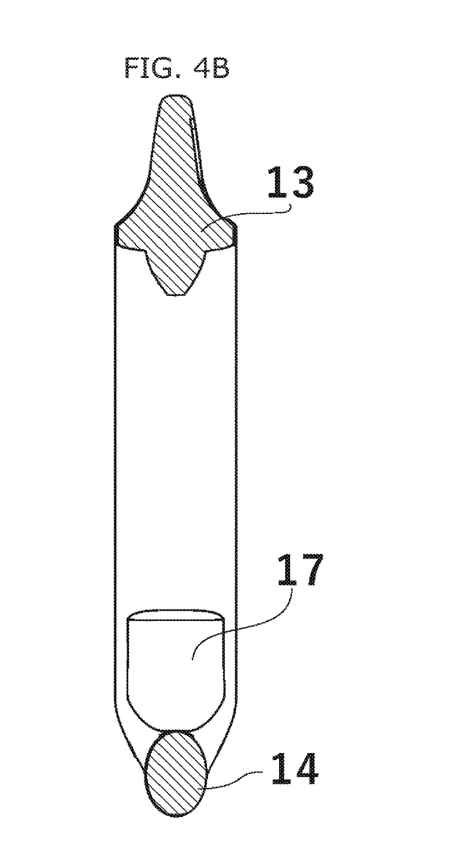
FIG. 4B depicts a cross-sectional view of the ring component taken along line A-A' in FIG. 4A.
Figure 4C:
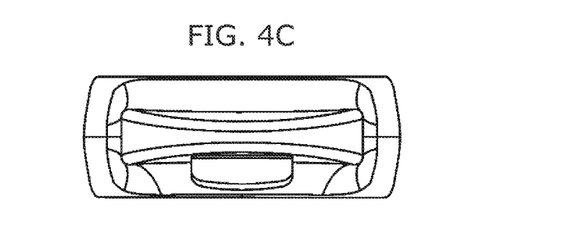
FIG. 4C depicts a plan view of a disclosed ring component.
Figure 4D:
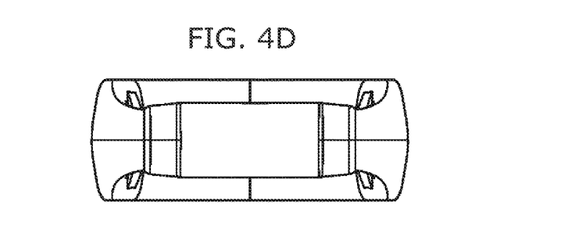
FIG. 4D depicts a bottom view of a disclosed ring component.
Figure 5A:
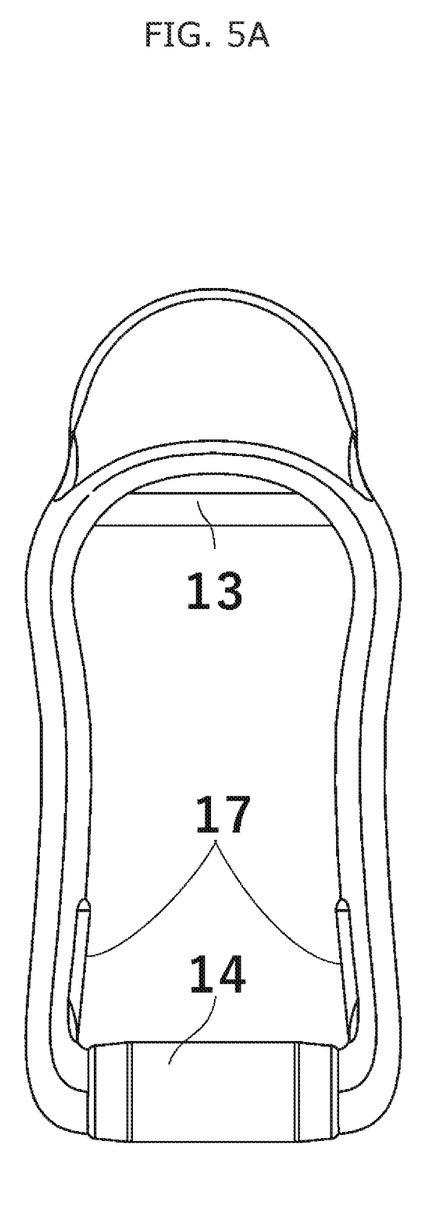
FIG. 5A depicts a back view of a disclosed ring component illustrated in FIG. 4A.
Figure 5B:
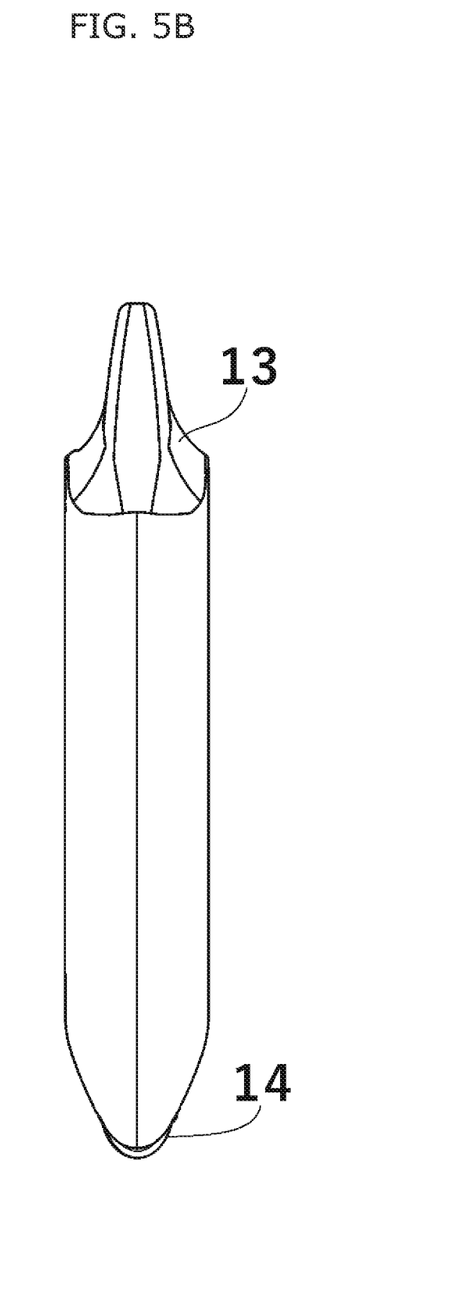
FIG. 5B depicts a side view of the ring component illustrated in FIG. 4A.

FIGS. 4A to 4D and FIGS. 5A and 5B illustrate the configuration of ring component 10. FIG. 4A is a front view of ring component 10, FIG. 4B is a cross-sectional view taken along line A-A' in FIG. 4A, FIG. 4C is a plan view, and FIG. 4D is a bottom view. FIG. 5A is a back view of ring component 10 and FIG. 4C is a side view. Although an ellipse is used for the cross-section of holding portion 14 of ring component 10 which is held in holding recess 8, as long as the condition that ring component 10 can be held oriented away from grip 5 by being held between holding recess 8 and catch 11 is satisfied, it is possible to use a cross-section shape having at least one straight portion such as a polygon or a shape obtained by cutting part of a circle in a straight line.

Ring component 10 has, in an inner circumferential surface, projecting portions 17, and by holding the end of grip 4 between projecting portions 17 when the lock is released, the orientation of ring component 10 can be fixed. By providing projecting portions 17, the ring component 10 orientation holding force can be enhanced.

The shape of the ring portion of ring component 10 is a keyhole shape or a rectangular shape, but is not limited to such. For example, the shape of the ring portion may be made circular to enable the user to insert a finger and securely hold scissors 1. When considering this purpose, it is preferable that a rubber resin which is soft and elastic compared to grips 4 and 5 be used for ring component 10.

Figure 6A:
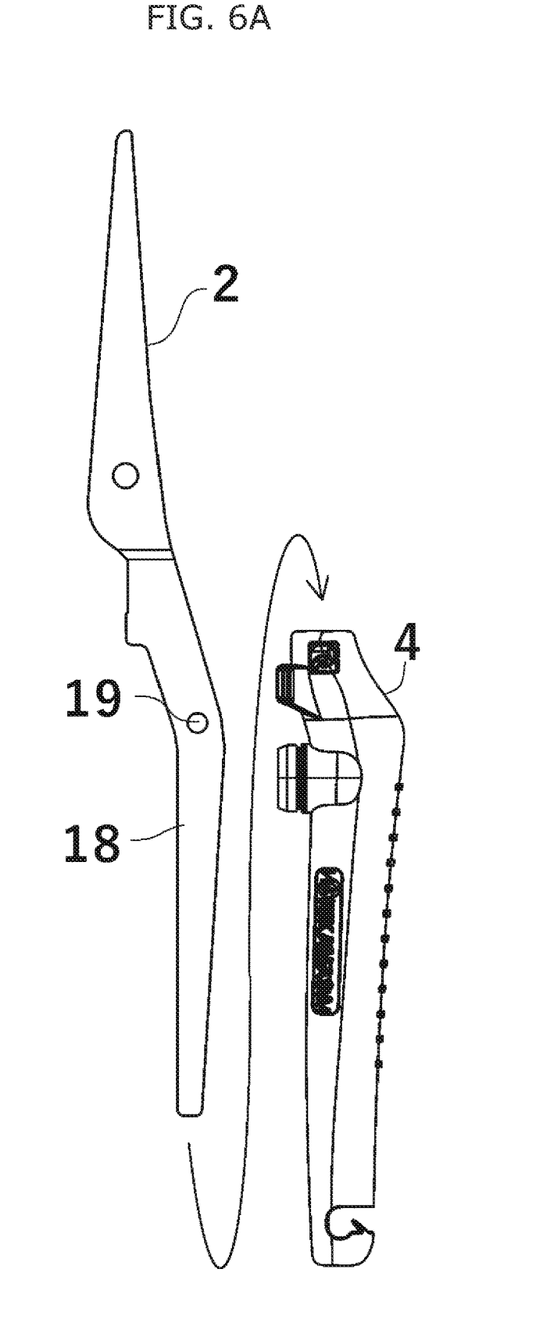
FIG. 6A depicts a diagram illustrating a process of assembling shears which are an example of the hand-operated tool.
Figure 6B:
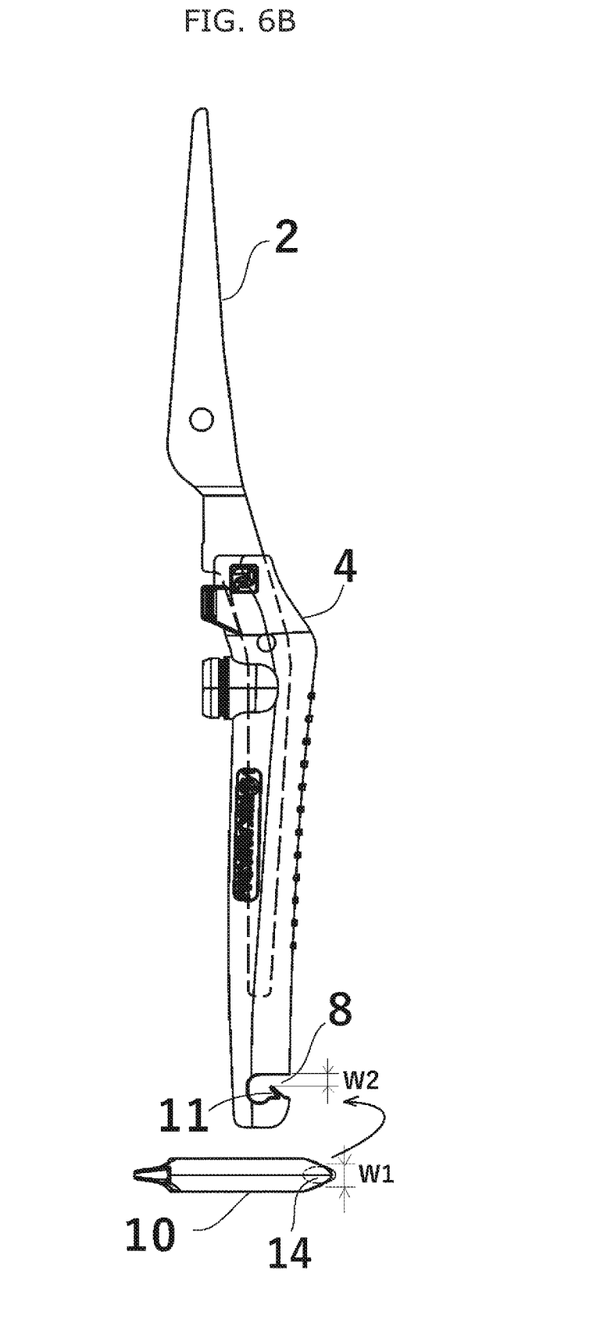
FIG. 6B depicts a diagram illustrating a process of assembling shears which are an example of a presently disclosed hand-operated tool.
Figure 7:
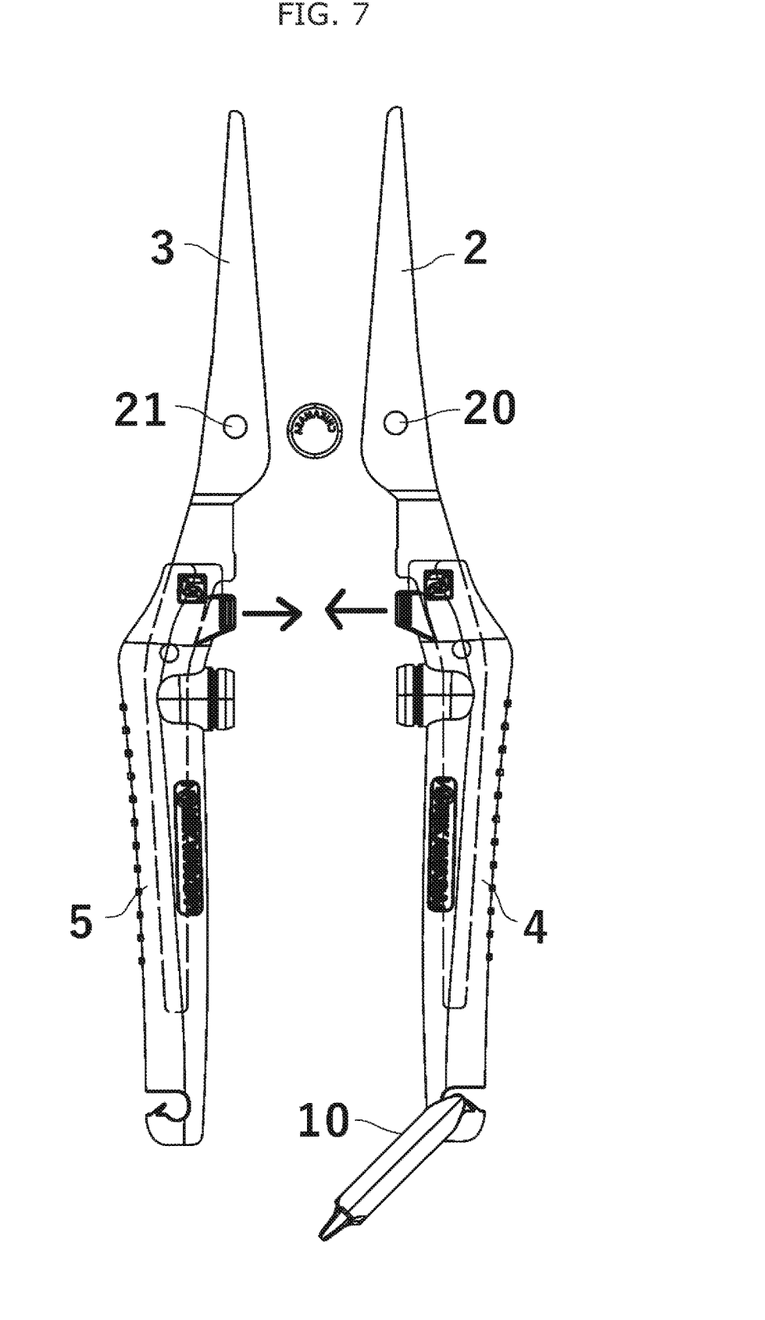
FIG. 7 depicts a process of assembling the shears which are an example of the hand-operated tool.

FIGS. 6A and 6B and FIG. 7 illustrate an assembly process of scissors 1. As illustrated in FIG. 6A, grip 4 is a resin molded product having the same structure as grip 5, and is fabricated by pouring a thermoplastic resin into a mold. Shank portion 18 of blade 2 of scissors 1 is inserted during the forming or after the forming of grip 4. By inserting the shank portion 18 in the mold beforehand during the forming of grip 4, resin enters hole 19 thereby making it possible to enhance the strength of the attachment to grip 4.

As illustrated in FIG. 6B, ring component 10 is attached to holding recess 8 of grip 4 to which blade 2 has been attached. Swingable tongue piece-shaped catch 11 enables removable attachment of ring component 10 to holding recess 8 without using a special tool and additional components. Holding portion 14 of ring component 10 has a narrowest width W1 (vertical width) in the orientation illustrated in the figure, thereby facilitating attachment. Since the cross-section is an ellipse, in the orientation in FIG. 2 after attachment for example, the apparent width (the vertical width) increases, and thus ring component 10 is not easily detached. Catch 11 projects inward in holding recess 8, and width W2 defined by catch 11 is smaller than width W1. As such, catch 11 has a non-return function which prevents ring component 10 which has been attached from detaching from holding recess 8. Catch 11 makes ring component 10 easy to attach to and difficult to detach from holding recess 8. However, since catch 11 is not a perfect non-return catch, replacement of ring component 10 is possible when necessary. Furthermore, aside from functioning as a catch, catch 11 functions together with holding recess 8 to place ring component 10 in a predetermined orientation. As illustrated in FIG. 7, by coupling grip 4 and grip 5 at pivot holes 20 and 21 of blades 2 and 3, scissors 1 illustrated in FIG. 1 is completed.

Scissors 1 having the above-described configuration have the advantage that left and right grips 4 and 5, which have the same shape, can be fabricated using one type of mold, and thus the number of components is small, which facilitates reduction of fabrication cost. Furthermore, with grips 4 and 5 which are fabricated in the same shape, the recesses are not wasted as one functions as holding recess 8 of ring component 10 and the other functions as engaging recess 9 of ring component 10.

Figure 8A:
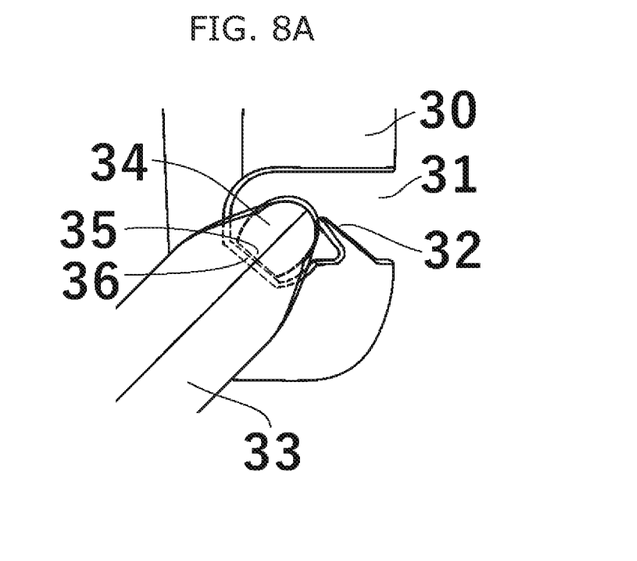
FIG. 8A depicts a modification of a disclosed ring component.
Figure 8B:
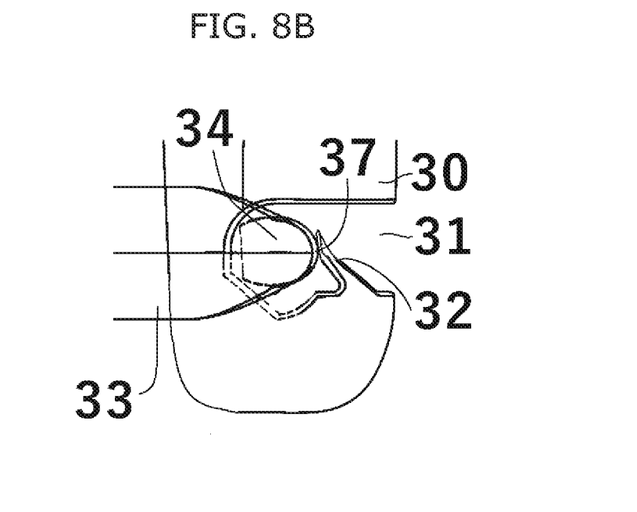
FIG. 8B depicts a modification of a disclosed ring component.

FIGS. 8A and 8B are diagrams illustrating the case where the cross-section of holding portion 14 of ring component 10 which is held in holding recess 8 has a shape having at least one straight portion. The figures illustrate the case where the cross-section has a shape obtained by cutting a portion of a circle in a straight line. FIG. 8A illustrates the state in which holding recess 31 and catch 32 according to this modification hold catch 32 oriented away from the other grip that is not illustrated in the figure. As illustrated in the figure, in this modification, by providing straight portion 35 in the cross-section of holding portion 34 of ring component 33 which is held in holding recess 31 and providing straight portion 36 in holding recess 31, ring component 33 can be held in the desired orientation more stably, that is, with little or no play. FIG. 8B illustrates the locked state in which ring component 33 is engaged with the engaging recess of the other grip that is not illustrated in the figure. Catch 32 of holding recess 31 pushes against apex portion 37 of holding portion 34 of ring component 33 which is held, and, when ring component 33 is disengaged from the engaging recess of the other grip that is not illustrated in the figure, catch 32 induces ring component 33 to assume the orientation illustrated in FIG. 8A.

The present invention is not limited to the foregoing embodiment, and various modifications are possible without departing from the teachings of the present invention. For example, aside from being fabricated using molds, grips 4 and 5 may be fabricated using 3D molding technology such as a 3D printer. Even in this case, the left and right grips can also use identical structures, and thus there is the advantage of being able to reduce the number of components. A plurality of the tongue piece-shaped catches 11, for example, two at opposing positions, can be provided at the opening portion of holding recess 8.

Although a thermoplastic resin is used for grip 4 in the foregoing embodiment, grip 4 is not limited to a thermoplastic resin as long as identical structures can be fabricated and the friction coefficient required for the orientation holding with ring component 10 can be obtained. For example, an industrial material having rubber elasticity such as synthetic rubber, thermoplastic elastomer (TPE), thermosetting resin-based elastomer (urethane rubber, silicone rubber, fluororubber), etc. can be used for grip 4. By using a resin having rubber elasticity for grip 4, a preferable gripping force can be obtained. Furthermore, it is preferable that the contact surfaces between ring component 10 and catch 11 be made rough to increase the friction coefficient. In this case, the ring component 10 orientation holding force when the lock is released can be enhanced.

INDUSTRIAL APPLICABILITY

The lock mechanism according to the present invention can be used not only in scissors but also in hand-operated tools of a type which cuts or clamps an object by a pair of grips which are forced into a normally-open state being squeezed together, and analogous tools.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

What is claimed is:

1. A lock mechanism comprising:
   a first grip (4) and a second grip (5) comprise a pair of grips, the first grip comprising a holding recess (8) and the second grip comprising an engaging recess (9);
   a ring component (10) comprising a tip portion (13) and a holding portion (14) wherein the holding portion (14) is removably and rotatably disposed in the holding recess (8) and the tip portion (13) engages with the engaging recess (9) to place the pair of grips (4 and 5) in a closed locked state; and
   a swingable tongue piece-shaped catch (11) further defining the holding recess (8) of the first grip (4) for removably and rotatably inserting the holding portion (14) into the holding recess (8), wherein
   when the tip portion (13) is disengaged from the engaging recess (9), and the ring component (10) is rotated about the holding portion (14), the holding portion (14) is an elliptical shape which contacts the swingable tongue piece-shaped catch (11) and a surface of the holding recess (8) to orient the ring component (10) apart from and out of contact with the second grip (5) even when the pair of grips are closed.

2. The lock mechanism of claim 1, wherein the holding portion (14) of the ring component (10) comprises a cross-section having at least one straight portion.

3. The lock mechanism of claim 2, wherein the ring component (10) further comprises, in an inner circumferential surface, projecting portions (17) which fix an orientation of the ring component (10) by holding the second grip (5) there between, when the ring component (5) is disengaged from the engaging recess (9).

4. The lock mechanism of claim 1, wherein
   the engaging recess (9) of the second grip (5) includes a second swingable tongue piece-shaped catch (12), and
   the tip portion (13) of the ring component (10) engages with the engaging recess (9) of the second grip (5).

5. The tool lock mechanism of claim 1, wherein each grip of the pair of grips (4 and 5) is a single-piece product molded from resin.

6. The tool lock mechanism of claim 2, wherein each grip of the pair of grips (4 and 5) is a single-piece product molded from resin.

7. The tool lock mechanism of claim 3, wherein each grip of the pair of grips (4 and 5) is a single-piece product molded from resin.

8. The tool lock mechanism of claim 4, wherein
   each grip of the pair of grips (4 and 5) is a single-piece product molded from resin, and
   the swingable tongue piece-shaped catch (11) is disposed near an opening of the holding recess (8).

* * * * *